US012467292B2

(12) United States Patent
Bal

(10) Patent No.: US 12,467,292 B2
(45) Date of Patent: Nov. 11, 2025

(54) DOOR LOCK MECHANISM

(71) Applicant: TUSAS-TURK HAVACILIK VE UZAY SANAYII ANONIM SIRKETI, Ankara (AR)

(72) Inventor: Mustafa Bal, Ankara (AR)

(73) Assignee: TUSAS-TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 65 days.

(21) Appl. No.: 18/236,163

(22) Filed: Aug. 21, 2023

(65) Prior Publication Data

US 2024/0068278 A1 Feb. 29, 2024

(30) Foreign Application Priority Data

Aug. 24, 2022 (TR) ................................ 2022/013302

(51) Int. Cl.
*E05C 9/04* (2006.01)

(52) U.S. Cl.
CPC ...................................... *E05C 9/04* (2013.01)

(58) Field of Classification Search
CPC ... E05C 9/04; E05C 9/00; E05C 9/002; E05C 9/042; E05C 9/043; E05C 9/045; E05C 9/048; E05C 9/10; E05C 9/14; E05C 9/16; E05C 9/18; E05C 9/1825; E05C 9/1833; E05C 9/1841; E05C 9/185; E05B 65/08; E05B 65/087; E05B 65/0876; E05B 2065/0805; E05B 63/12; E05B 63/121; E05B 63/126; Y10S 292/46; B64C 1/14; B64C 1/1407; B64C 1/1438
USPC ............................................................ 49/450
See application file for complete search history.

(56) References Cited

U.S. PATENT DOCUMENTS

| | | | | |
|---|---|---|---|---|
| 10,443,271 | B1 * | 10/2019 | Rose | E05C 3/16 |
| 11,299,250 | B2 | 4/2022 | Movsesian et al. | |
| 2011/0173891 | A1 * | 7/2011 | Laliberte | E05B 65/08 70/95 |
| 2015/0143664 | A1 * | 5/2015 | Liang | E05C 17/62 16/82 |
| 2015/0368956 | A1 * | 12/2015 | Baczuk | E05C 1/06 49/449 |
| 2019/0144098 | A1 * | 5/2019 | Gallagher, Jr. | E05D 15/0604 244/118.5 |
| 2019/0211583 | A1 * | 7/2019 | Capozziello | E05B 63/0056 |
| 2020/0216160 | A1 * | 7/2020 | Griffiths | E05D 15/1081 |
| 2021/0387713 | A1 * | 12/2021 | Dubosc | B64C 1/1438 |

(Continued)

*Primary Examiner* — Christine M Mills
*Assistant Examiner* — Yahya Sidky
(74) *Attorney, Agent, or Firm* — Notaro, Michalos & Zaccaria P.C.

(57) ABSTRACT

A door is on the body of a vehicle. A handle is on the door to allow movement of the door. At least one rail is on the body to allow the door to slide thereon. A plurality of lock elements are located on the door in connection with the handle which are triggered by the handle to move in the direction they extend. A plurality of slots in the form of a groove are located on the body for allowing the lock element to be inserted and removed therein. The door has a free position in which the door is allowed to move on the rail when the lock element is completely removed from the slot and a locked position in which the movement of the door is restricted when the lock element, which has been at least partially inserted into the slot, contacts the wall of the slot.

14 Claims, 3 Drawing Sheets

(56) References Cited

U.S. PATENT DOCUMENTS

| | | | | |
|---|---|---|---|---|
| 2023/0399105 | A1* | 12/2023 | Panjer | E05B 85/22 |
| 2024/0188715 | A1* | 6/2024 | Chen | E05C 3/16 |
| 2024/0199093 | A1* | 6/2024 | Huck | B61D 19/005 |

* cited by examiner

DOOR LOCK MECHANISM

CROSS-REFERENCE TO RELATED APPLICATION

This application claims priority to Turkish Patent Application No. 2022/013302, filed Aug. 24, 2022, which is incorporated herein by reference.

FIELD

The present invention relates to a door lock mechanism suitable for use in doors of air vehicles.

BACKGROUND

As one of the equipment used in aviation industry, lock mechanisms used in doors are important. In air vehicle sliding door systems, when an external or internal lock system is requested, the mechanism intended to lock the system moves first in the door movement axis and then in the direction perpendicular to the door movement axis, so that the locking process is completed. In similar lock systems, mostly hook type lock systems are preferred. However, the reliability of such systems is low (the ability of the system to cling to its slot), together with the increasing risk of injury to the user. There is a need to provide a light and effective lock system suitable for aviation structures.

US2011173891, which is included in the known-state of the art, discloses a device and a system comprising a release assembly configured to unlock a sliding door panel from left and right sides of the sliding door panel. The left and right sides of the sliding door panel are opposed in the sliding direction.

U.S. Ser. No. 11/299,250, which is included in the known-state of the art, discloses a door assembly relative to a flight deck door of an aircraft. There is provided a latch, which is positioned on an edge of the door and arranged to engage the latch recess when the door is in a closed position within the door frame. An access door is rotatable from a closed position to an open position in a forward direction. A first mechanical door handle system including a mechanical combination lock, positioned on an aft side of the privacy door and coupled to the latch is disclosed.

SUMMARY

Thanks to the door lock mechanism according to the present invention, more effective and reliable locking is provided.

Another object of the present invention is to provide a lighter door lock system for air vehicles.

A further object of the present invention is to provide a practical, effective and easy way to lock and unlock the doors.

The door lock mechanism realized to achieve the object of the invention, which is defined in the first claim and other claims dependent thereon, comprises a body on an air and/or space vehicle that separates the passenger compartment from the cargo area; at least one door located on the body to close the opening, so as to provide access to the cargo area; at least one handle on the door that triggers the lock elements to bring the door to a movable position. The door moves by sliding on a rail with a channel structure. In order to make the door movable, the handle must be triggered once and kept in the trigger position until the contact between the lock element and the housing wall is interrupted. There are various members on the door for transferring movement from the handle to the lock element, and there are lock elements that can move in and out of the slot by moving linearly in dependence of these members. There are multiple slots on the rail and on the body to which the rail is attached, with a recess that will allow the lock element to be inserted. By removing all of the lock elements from the slot, the door gains freedom of movement on the rail and has the free position (F), and when the lock element is brought into contact with the inner cavity of the slot, movement of the door is restricted, such that it is in the locked position (L).

The door lock mechanism according to the invention comprises a transfer element which, when actuated by the handle, rotates around a fastener to which the transfer element is mounted rotatably on the door, so that the lock elements are contacted with the slot or disconnected from the slot. By means of the transfer element, all the lock elements can be triggered by a single handle such that they perform a simultaneous linear movement to enter and exit the slots. The sliding element is triggered by the movement of the transfer element to perform an up and down movement, thus activating the lock elements.

In an embodiment of the invention, the door lock mechanism comprises a fastener that enables the transfer element to be rotatably connected to the body; and a pin that enables the transfer element to be placed in a space between the plates on the sliding element. The plates are connected to each other by means of pins and a part of the transfer element is positioned to remain between the plates.

In an embodiment of the invention, the door lock mechanism comprises a sliding element that moves within a frame on the transfer element. Thanks to the pin moving on the frame wall, the lock elements are activated to move the door from the locked position (L) to the free position (F) or from the free position (F) to the locked position (L). The sliding element has a pin which is triggered by the movement of the transfer element and moves on the frame surfaces so as not to interrupt the contact with the surface.

In an embodiment of the invention, the door lock mechanism comprises the pin which terminates rotation of the transfer element and movement of the sliding element on the transfer element when it contacts the fastener. Therefore, it restricts the upward movement of the lock elements when removed from the slot and their contact with the slot wall is interrupted, and restricts the downward movement of the lock elements placed in the slot, so as to prevent application of extra pressure on the slot wall and/or other elements. By changing position or diameter of the fastener and pin, rotation angle of the transfer element can be adjusted to a desired value by the manufacturer.

In an embodiment of the invention, the door lock mechanism comprises a first slot in which the first lock element is inserted and a second slot in which the second lock element is inserted. The lock elements are located at different ends of the sliding element, almost diagonally with each other. The first slot is provided on the movement direction of the first lock element, and the second slot is provided on the movement direction of the second lock element, so that the first lock element and the second lock element are prevented from being inserted in the same slots.

In an embodiment of the invention, the door lock mechanism comprises the sliding element in a curved form. Thus, the lock elements are positioned on lines that are spaced apart and parallel to each other. The slots are positioned on the rail to correspond to the lock elements, and the first lock element can only be inserted in the first slots, and the second lock element can only be inserted in the second slots.

In an embodiment of the invention, the door lock mechanism comprises the rail with a channeled structure on the body, between the door and the body, for allowing the door to be slidably attached to the body. The slots are located on the rail, and an inclined surface is provided at the slot structure, which allows the lock element to be inserted into the slot automatically during the door movement. The lock element is inserted into the slot by performing a sliding and/or rolling movement on the inclined surface.

In an embodiment of the invention, the door lock mechanism comprises an extension located at the connection region of the lock element and the sliding element, so as to extend outward from the lock element. The extension is placed in the cavity on the sliding element in a movable manner. While the lock element moves on the inclined surface, the extension slides up and down inside the cavity, providing a movement area for the lock element.

In an embodiment of the invention, the door lock mechanism comprises open position (O) in which the body is in the locked position (L) to allow access between the regions on both sides of the body.

In an embodiment of the invention, the door lock mechanism comprises a spring which surrounds the extension and is compressed when the door is moved from the locked position (L) to free position (F), so that the locking element is removed from the slot.

In an embodiment of the invention, the door lock mechanism comprises a compression element that enables the spring on the door to be pressed and compressed by means of the lock element, thus enabling the spring to store energy as a result of the pressure applied thereon. There is a hole on the compression element, through which the extension is passed. While the extension is moving in the cavity, it is pressed and compressed between the compression element and the spring lock element, which has a larger diameter than the hole diameter and surrounds the extension.

In an embodiment of the invention, the door lock mechanism comprises rods that transfer movement of the handle to the transfer element. The movement resulting from the rotation of the handle is transferred to the transfer element by means of the rods, so that the transfer element is rotated.

In an embodiment of the invention, the door lock mechanism comprises the first rail located between the door and the body, in a lower part of the door in contact with the body; and a second rail located at the top of the door in contact with the body, facing the first rail, with a distance from the air vehicle roof greater than that of the first rail. When the door is moved from the locked position (L) to the free position (F), the lock elements located in the slots on the first and second rails can be removed from the slots by the user triggering the handle, as a result of the trigger action.

In an embodiment of the invention, the door lock mechanism comprises the circular frame in the form of a pie slice with the fastener as the center.

In an embodiment of the invention, the door lock mechanism comprises a door which slides on the rail and is suitable for use as a sliding door; and the rail.

BRIEF DESCRIPTION OF THE DRAWINGS

The door lock mechanism realized to achieve the object of the present invention is illustrated in the attached drawings, in which.

Figure 1:
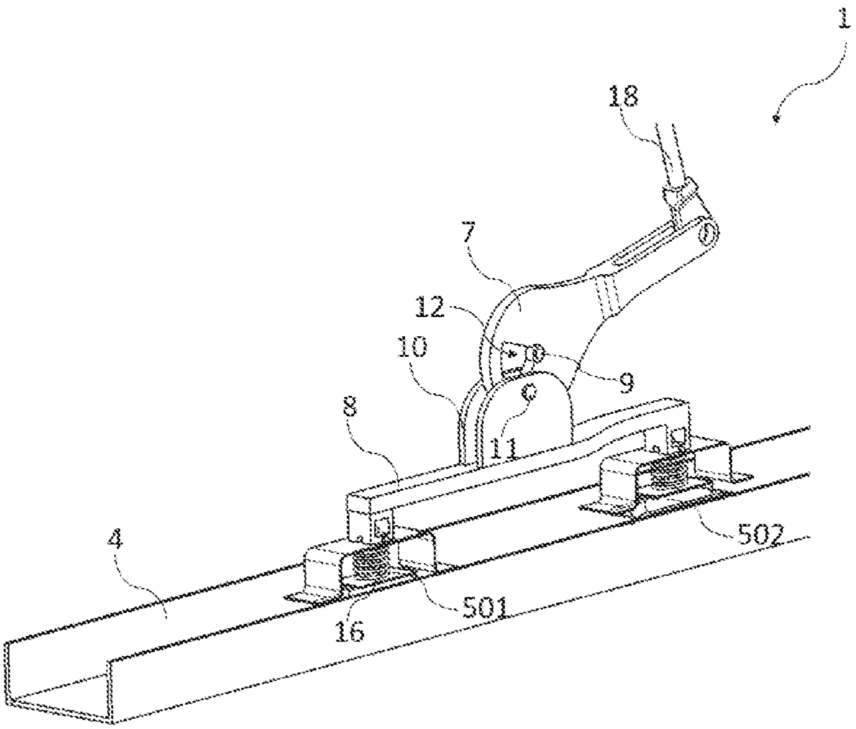
FIG. 1 is a perspective view of the door lock mechanism.

All the parts illustrated in figures are individually assigned a reference numeral and the corresponding terms of these numbers are listed below:

1. Door lock mechanism
2. Door
3. Handle
4. Rail
  401. First rail
  402. Second rail
5. Lock element
  501. First lock element
  502. Second lock element
6. Slot
  601. First slot
  602. Second slot
7. Transfer element
8. Sliding element
9. Fastener
10. Plate
11. Pin
12. Frame
13. Inclined surface
14. Extension
15. Cavity
16. Spring
17. Compression element
18. Rod
(G) Body
(F) Free position
(L) Locked position
(O) Open position

DETAILED DESCRIPTION

The door lock mechanism (1) comprises at least one body (G) on an air and/or space vehicle; at least one door (2) on the body (G); at least one handle (3) on the door (2), which allows the door (2) to move; at least one rail (4) on the body (G), which allows the door (2) to slide thereon; a plurality of lock elements (5) which are located on the door (2) in connection with the handle (3), and are triggered by the handle (3) to move in the direction they extend; a plurality of slots (6) in the form of a groove, which are located on the body (G) for allowing the lock element (5) to be inserted and removed therein; the door (2) having a free position (F) in which the door is allowed to move on the rail (4) when the lock element (5) is completely removed from the slot (6); the door (2) having a locked position (L) in which the movement of the door is restricted when the lock element (5), which has been at least partially inserted into the slot (6), contacts the wall of the slot (6) (FIG. 1).

Figure 2:
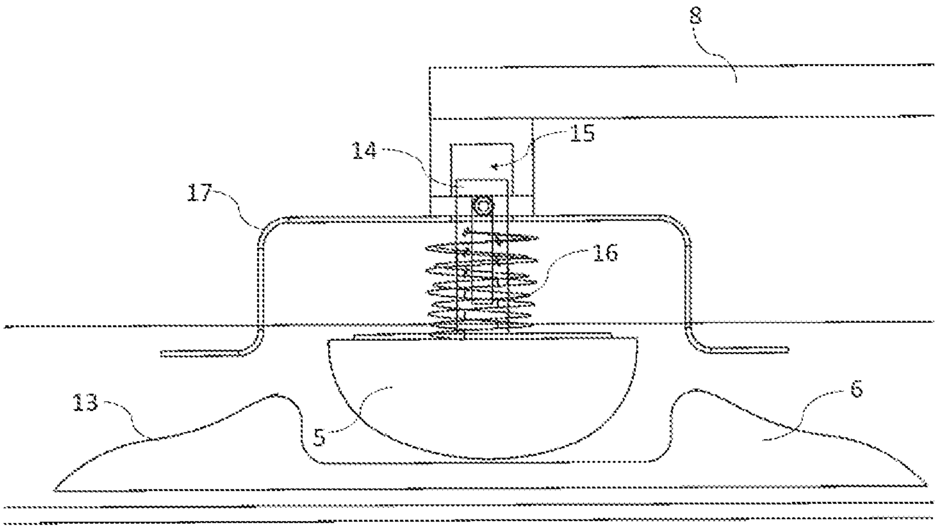
FIG. 2 is a schematic view of the door in the locked position (L).

The door lock mechanism (1) according to the invention comprises at least one transfer element (7) located on the door (2) rotatable around an axis to which it is attached, wherein the transfer element (7) is triggered by the handle (3) to activate the lock elements (5) simultaneously; a sliding element (8) located in connection with the transfer element (7) and the lock element (5), wherein the sliding element (8) is triggered by the rotational movement of the transfer element (7) to perform a sliding movement on the transfer element (7), thus enabling the lock elements (5) to be inserted or removed from the slot (6) by performing a linear movement due to the rotational movement of the transfer element (7) (FIG. 2).

The door lock mechanism (1) comprises the body (G) on the air and/or space vehicle that separates the passenger compartment from the cargo area; the door placed on the body (G) to provide access between these areas. It comprises at least one handle (3) on the door (2), which triggers the lock elements (5) to bring the door (2) to the movable position. The door (2) moves by sliding on a rail (4) with a channel structure. In order to make the door (2) movable, the handle (3) must be triggered once and kept in the trigger position until the contact between the lock element (5) and the slot (6) wall is interrupted. Thera are various members on the door (2) for transferring movement from the handle (3) to the lock element (5), and there are lock elements (5) that can move in and out of the slot (6) by moving linearly in dependence of these members. There are multiple slots (6) on the rail (4) and on the body (G) to which the rail (4) is attached, with a recess that will allow the lock element (5) to be inserted. By removing all of the lock elements (5) from the slot (6), the door (2) gains freedom of movement on the rail (4) and has the free position (F), and when the lock element (5) is brought into contact with the inner cavity of the slot (6), movement of the door (2) is restricted, such that it is in the locked position (L).

By means of the transfer element (7), which is mounted on the door (2) in a rotatable manner with the movement of the handle (3) and which performs a rotational movement around the fastener (9) to enable the lock elements (5) to contact and break the contact with the slot, all lock elements (501,502) can be triggered with a single movement to perform a simultaneous linear movement, such that they can be inserted and removed from the slots (6). The sliding element (8) is triggered by the movement of the transfer element (7) and performs an up and down movement, thereby activating the lock elements (5).

Figure 3:
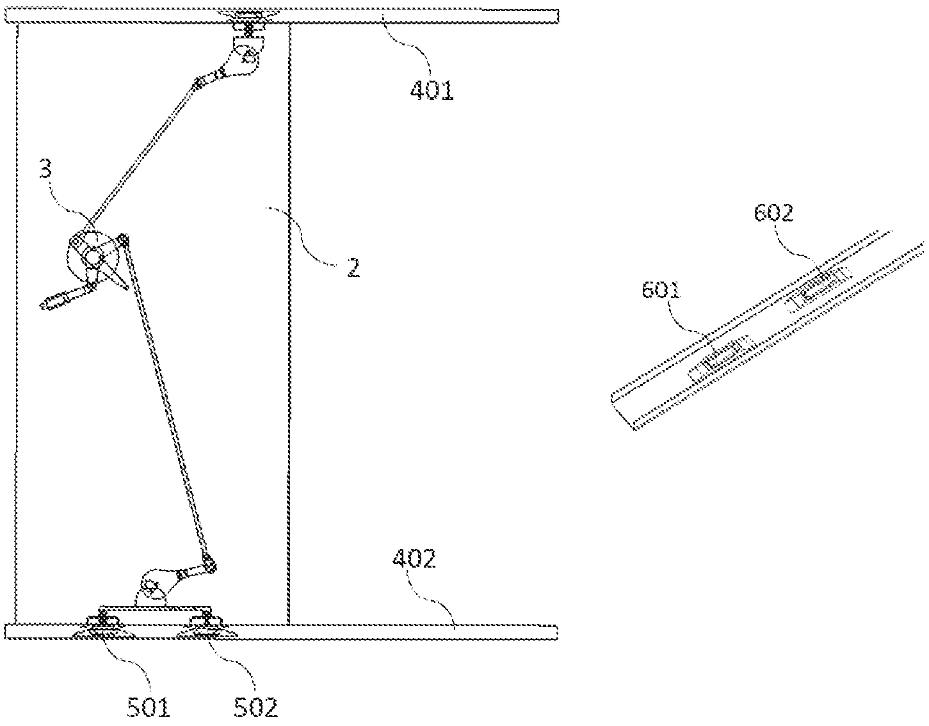
FIG. 3 is a schematic view of the door lock mechanism.

In an embodiment of the invention, the door lock mechanism (1) comprises a fastener (9) enabling the transfer element (7) to be attached to the body (G) with a freedom of rotational movement; a plurality of plates (10) which are located opposite to each other on the sliding element (8) with a distance therebetween, and which at least partially surround the transfer element (7) on both sides; a pin (11) located in the transfer element (7) in contact with the transfer element (7) and enabling the plates (10) to be connected to each other. In this way, rotational movement of the transfer element (7) is transferred to the lock elements (5) and the lock elements (5) can be moved linearly (FIG. 3).

Figure 4:
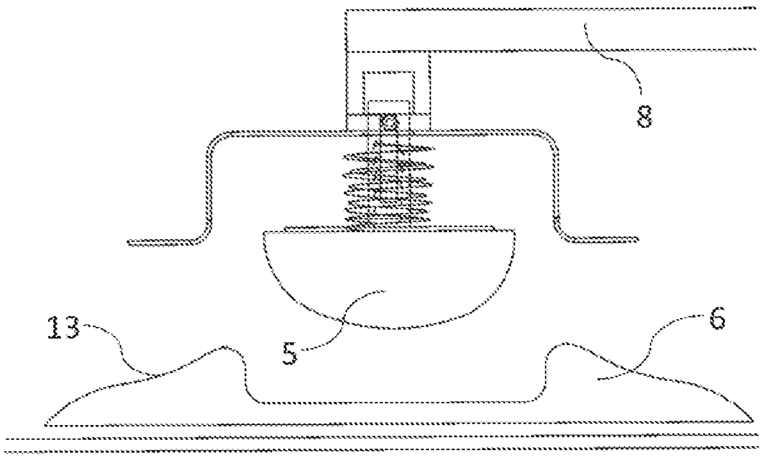
FIG. 4 is a schematic view of the door in the free position (F).

In an embodiment of the invention, the door lock mechanism (1) comprises a frame (12) on the transfer element (7), which allows the sliding element (8) to perform a sliding movement therein; the pin (11) on the sliding element (8), which performs a sliding movement on the wall of the frame (12) to trigger the lock elements (5), thus allowing the door to move between the locked position (L) and the free position (F). There are provided a frame (12) on the transfer element (7); the pin (11) on the sliding element (8), which performs a sliding movement on the wall of the frame (12) to trigger the locking elements (5), thus allowing the door to move between the locked position (L) and the free position (F); a frame (12) on the sliding element (10), which allows the sliding element (10) to perform a sliding movement in the transfer element (7); the sliding element (8) which moves the lock element ( ) up and down with the movement of the pin (11) on the wall of the frame (12). Therefore, the lock elements (5), which are triggered by the movement of the sliding element (8), perform linear motion to be inserted and removed from the slot (6) (FIG. 4).

In an embodiment of the invention, the door lock mechanism (1) comprises the pin (11) which, when it contacts the fastener (9), restricts the rotational movement of the transfer element (7) at an angle value predetermined by the manufacturer, thereby restricting the linear movement of the lock elements. There is a transfer element (7) whose rotational movement is restricted at a certain angle value due to the contact between the fastener (9) and the pin (11). Therefore, it restricts the upward movement of the lock elements (5) when removed from the slot (6) and their contact with the slot (6) wall is interrupted, and restricts the downward movement of the lock elements (5) placed in the slot (6), so as to prevent the lock element (5) from applying pressure on the slot (6) wall. By changing position or diameter of the fastener (9) and pin (11), rotation angle of the transfer element (7) can be restricted to a desired position by the manufacturer.

Figure 5:
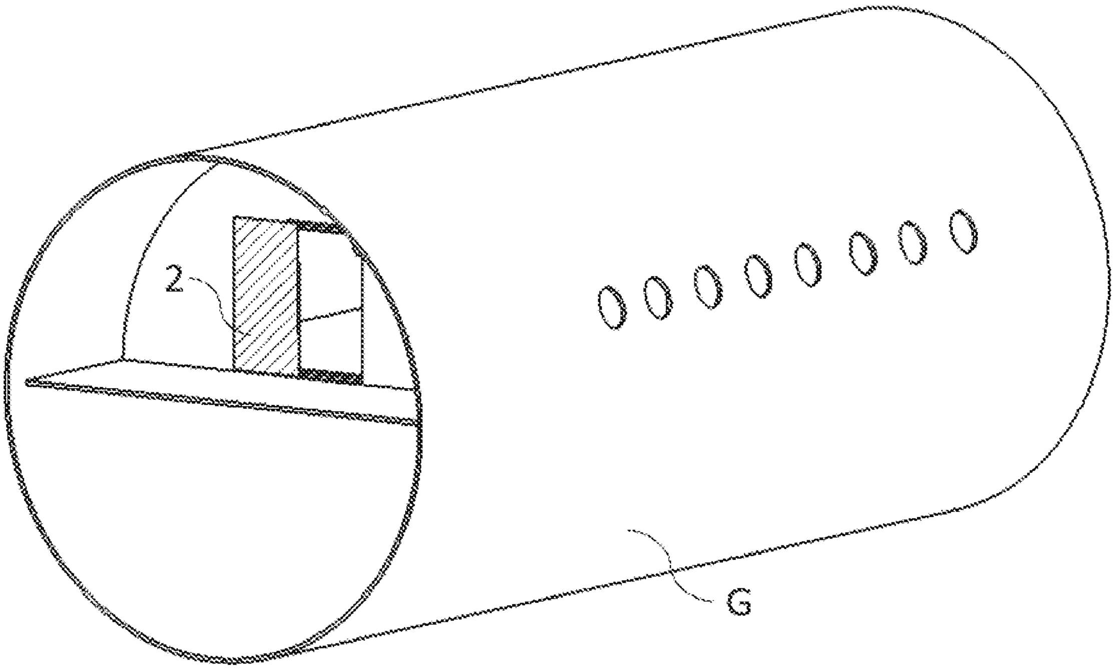
FIG. 5 is a perspective view of the body and the door in the open position (O).

In an embodiment of the invention, the door lock mechanism (1) comprises a first lock element (501) and a second lock element (502) that are located on the sliding element (5); lock elements (5) that move in conjunction with the movement of the door (2) on the rail (4) when the door (2) is in the free position (F); the first slot (601) located on movement direction the first lock element (501) and allowing the first lock element (501) to be inserted therein; and the second slot (602) located on the movement direction of the second lock element (502) and allowing the second lock element (502) to be inserted therein. Thanks to the lock elements located crosswise with each other at the different ends of the sliding element (5), the first lock element (501) and the second lock element (502) are prevented from being inserted into the same slot (6) (FIG. 5).

In an embodiment of the invention, the door lock mechanism (1) comprises the first lock element (501) and the second lock element (501) which are located parallel to each other with a distance therebetween, thus preventing the first lock element (501) from entering the second slot (602) and the second lock element (502) from entering into the first slot (601); the sliding element (8) in a curved form, with the first lock element (501) on one end and the second lock element (502) on the other end. Thanks to the slots corresponding to the predetermined lock elements, it is ensured that the first lock element is placed only in the first slot, and the second lock element only in the second slot.

In an embodiment of the invention, the door lock mechanism (1) comprises the rail (4) extending longitudinally between the door (2) and the body (G) and enabling the door (2) to be connected to the body (G); the slot (6) on the rail (4); a plurality of inclined surfaces (13) on the slot (6), which allow the lock element (5) contacting the slot (6) to slide thereon so as to be inserted into the slot (6). Thanks to the channeled structure of the rail (4), the door (2) is slidably attached to the body (G), and the lock element (5), which performs a sliding and/or rolling movement on the inclined surface (13), is automatically inserted into the slot (6) during its movement on the door (2) rail (4).

In an embodiment of the invention, the door lock mechanism (1) comprises an extension (14) on the lock element (5), which enables the lock element (5) to be connected to the sliding element (8); a cavity (15) on the sliding element (8), which allows the extension (14) to move therein, thus allowing the movement of the lock element (5) on the inclined surface (13). While the lock element (5) moves on the inclined surface (13), the extension (14) moves up and down in the cavity (15) to provide freedom of movement to the lock element (5).

In an embodiment of the invention, the door lock mechanism (1) comprises an open position (O) in which, when the lock element (5) is in the free position (F), the door (2) is moved on the rail (4) to be positioned to form an opening on the body (G) and is fixed by moving the lock element (5) to the locked position (L). Fixing the lock element (5) in the open position (O) provides safe access between the areas located on two different sides of the body (G).

In an embodiment of the invention, the door lock mechanism (1) comprises at least one spring (16) which surrounds the extension (14) and which is compressed by the pressure force applied thereon when the door (2) is moved from the locked position (L) to the free position (F), thus allowing the lock element (5) to be removed from the slot (6). Since the spring (16) surrounding the extension (14) is compressed when the door (2) is moved from the locked position (L) to the free position (F), the lock element can be removed from the slot.

In an embodiment of the invention, the door lock mechanism (1) comprises a compression element (17) that enables the spring (12) on the door (2) to be compressed; the extension (14) on the lock element (5) is passed through the opening of the compression element (17) so as to be placed in the cavity (15), wherein the extension (14) moves in the cavity (15) such that the compression element (17) applies a pressure onto the spring (16) in order to store energy. Thanks to the compression element (17), the spring (16) is pressed by the lock element (5) and energy storage is provided. Thanks to the extension inserted into the cavity (15) by passing through the hole on the compression element (17), the spring (16) is pressed and compressed between the lock element (5) and the compression element (17).

In an embodiment of the invention, the door lock mechanism (1) comprises a plurality of rods (18) triggered by rotational movement of the handle (3), transferring movement of the handle (3) to the transfer elements (7), thus enabling the transfer element (7) to perform a simultaneous rotational movement with the handle (3). Movement of the handle (3) is transferred to the transfer element (7) by means of the rod (18), and it is ensured that a plurality of lock elements (5) are removed from the slot (6) simultaneously.

In an embodiment of the invention, the door lock mechanism (1) comprises a first rail (401) located between the door (2) and the body (G), on a side of the door (2) that has the minimum distance from the air vehicle base (T); a second rail (402) located on the other side of the door (2) opposite the first rail (401), with a distance to the air vehicle base (T) greater than that of the first rail (401); the door (2) which is almost completely prevented from moving in the locked position (L) by being fixed on both rails (4) by means of the first lock element (501) and the second lock element (502) that are placed simultaneously in the slots (6) on the first rail (401) and the second rail (402) with only a handle (3) movement. Therefore, the sliding movement of the door (2) can be restricted and the door can be fixed rigidly on the body (G).

In an embodiment of the invention, the door lock mechanism (1) comprises the frame (12) which forms the section of a circle covering an angle value predetermined by the user with the fastener (9) being centered. Thanks to the frame (12), the sliding element (10) can be moved on the transfer element (7).

In an embodiment of the invention, the door lock mechanism (1) comprises the sliding door (2) that slides on the rail (4). Therefore, the door (2) can be triggered by the handle (3) and moved to the open position (O) easily.

I claim:

1. A door lock mechanism (1) comprising:
- at least one body (G) on an air and/or space vehicle;
- at least one door (2) on the body (G);
- at least one handle (3) on the door (2), which allows the door (2) to move;
- at least one rail (4) on the body (G), which allows the door (2) to slide thereon;
- a plurality of lock elements (5) which are located on the door (2) in connection with the handle (3), and are triggered by the handle (3) to move in a direction they extend;
- a plurality of slots (6) in a form of a groove, which are located on the body (G) for allowing the lock element (5) to be inserted and removed therein;
- wherein the door (2) has a free position (F) in which the door is allowed to move on the rail (4) when the lock element (5) is completely removed from the slot (6), and wherein the door (2) has a locked position (L) in which movement of the door is restricted when the lock element (5), which has been at least partially inserted into the slot (6), contacts a wall of the slot (6);
- at least one transfer element (7) located on the door (2) rotatable around an axis to which it is attached, wherein the transfer element (7) is triggered by the handle (3) to activate the lock elements (5) simultaneously;
- a sliding element (8) located in connection with the transfer element (7) and the lock element (5), wherein the sliding element (8) is triggered by rotational movement of the transfer element (7) to perform a sliding movement on the transfer element (7), thus enabling the lock elements (5) to be inserted or removed from the slot (6) by performing a linear movement due to the rotational movement of the transfer element (7);
- wherein the rail (4) extends longitudinally between the door (2) and the body (G) and enables the door (2) to be connected to the body (G); and
- wherein the slot (6) is formed within the rail (4) with an inclined surface (13) on each side thereof, each inclined surface (13) configured to allow the lock element (5) contacting the slot (6) to slide thereon so as to be inserted into the slot (6).

2. The door lock mechanism (1) according to claim 1, comprising:
- a fastener (9) enabling the transfer element (7) to be attached to the body (G) with a freedom of rotational movement;
- a plurality of plates (10) which are located opposite to each other on the sliding element (8) with a distance therebetween, and which at least partially surround the transfer element (7) on both sides; and
- a pin (11) located in the transfer element (7) in contact with the transfer element (7) and enabling the plates (10) to be connected to each other.

3. The door lock mechanism (1) according to claim 2, comprising:
- a frame (12) on the transfer element (7), which allows the sliding element (8) to perform a sliding movement therein; and
- wherein the pin (11) on the sliding element (8) performs a sliding movement on a wall of the frame (12) to trigger the lock elements (5), thus allowing the door to move between the locked position (L) and the free position (F).

4. The door lock mechanism (1) according to claim 2, wherein the pin (11), when it contacts the fastener (9), restricts the rotational movement of the transfer element (7) at a predetermined angle value, thereby restricting the linear movement of the lock elements.

5. The door lock mechanism (1) according to claim 1, comprising:

a first lock element (501) and a second lock element (502) that are located on the sliding element (8);

wherein the lock elements (5) move in conjunction with the movement of the door (2) on the rail (4) when the door (2) is in the free position (F);

wherein a first slot (601) is located on a movement direction of the first lock element (501) and allows the first lock element (501) to be inserted therein; and wherein a second slot (602) is located on the a movement direction of the second lock element (502) and allows the second lock element (502) to be inserted therein.

6. The door lock mechanism (1) according to claim 5, wherein the first lock element (501) and the second lock element (501) are located parallel to each other with a distance therebetween, thus preventing the first lock element (501) from entering the second slot (602) and the second lock element (502) from entering into the first slot (601); and wherein the sliding element (8) has a curved form, with the first lock element (501) on one end and the second lock element (502) on the other end.

7. The door lock mechanism (1) according to claim 1, comprising:

an extension (14) on the lock element (5) which enables the lock element (5) to be connected to the sliding element (8); and a cavity (15) on the sliding element (8), which allows the extension (14) to move therein, thus allowing the movement of the lock element (5) on the inclined surface (13).

8. The door lock mechanism (1) according to claim 1, wherein the door (2) has an open position (O) in which, when the lock element (5) is in the free position (F), the door (2) moves on the rail (4) to be positioned to form an opening on the body (G) and is fixed by moving the lock element (5) to the locked position (L).

9. The door lock mechanism (1) according to claim 7, comprising at least one spring (16) which surrounds the extension (14) and which is compressed by a pressure force applied thereon when the door (2) is moved from the locked position (L) to the free position (F), thus allowing the lock element (5) to be removed from the slot (6).

10. The door lock mechanism (1) according to claim 9, comprising a compression element (17) that enables the spring (12) on the door (2) to be compressed; wherein the extension (14) on the lock element (5) is passed through an opening of the compression element (17) so as to be placed in the cavity (15); and wherein the extension (14) moves in the cavity (15) such that the compression element (17) applies a pressure onto the spring (16) in order to store energy.

11. The door lock mechanism (1) according to claim 1, comprising a plurality of rods (18) triggered by rotational movement of the handle (3) for transferring movement of the handle (3) to the transfer elements (7), thus enabling the transfer element (7) to perform a simultaneous rotational movement with the handle (3).

12. The door lock mechanism (1) according to claim 5, comprising:

a first rail (401) located between the door (2) and the body (G), on a side of the door (2) that has the minimum distance from the air vehicle base (T);

a second rail (402) located on the other side of the door (2) opposite the first rail (401), with a distance to the air vehicle base (T) greater than that of the first rail (401); and wherein the door (2) is almost completely prevented from moving in the locked position (L) by being fixed on both rails (4) by means of the first lock element (501) and the second lock element (502) that are placed simultaneously in the slots (6) on the first rail (401) and the second rail (402) with only a handle (3) movement.

13. The door lock mechanism (1) according to claim 3, wherein the frame (12) forms a section of a circle covering an angle value predetermined by a user with the fastener (9) being centered.

14. The door lock mechanism (1) according to claim 1, wherein the door (2) slides on the rail (4).

* * * * *